United States Patent
Spatafora

(10) Patent No.: US 6,913,132 B2
(45) Date of Patent: Jul. 5, 2005

(54) VARIABLE-CAPACITY STORE FOR ELONGATED ELEMENTS

(75) Inventor: Mario Spatafora, Bologna (IT)

(73) Assignee: G.D Societa Per Azioni, Bologna (IT)

( * ) Notice: Subject to any disclaimer, the term of this patent is extended or adjusted under 35 U.S.C. 154(b) by 0 days.

(21) Appl. No.: 10/475,280

(22) PCT Filed: Apr. 17, 2002

(86) PCT No.: PCT/IT02/00240
§ 371 (c)(1),
(2), (4) Date: Jun. 21, 2004

(87) PCT Pub. No.: WO02/085144
PCT Pub. Date: Oct. 31, 2002

(65) Prior Publication Data
US 2004/0216986 A1 Nov. 4, 2004

(30) Foreign Application Priority Data
Apr. 18, 2001 (IT) ...................... B02001A0227

(51) Int. Cl.[7] ................................. B65G 1/00
(52) U.S. Cl. ................. 198/347.1; 198/347.3; 198/812
(58) Field of Search ............. 198/347.1, 347.3, 198/778, 812, 588

(56) References Cited

U.S. PATENT DOCUMENTS

| | | | | |
|---|---|---|---|---|
| 812,154 A | * | 2/1906 | Scott et al. | 99/366 |
| 1,767,905 A | * | 6/1930 | Walker | 210/210 |
| 3,750,859 A | * | 8/1973 | Smith | 198/776 |
| 4,299,322 A | * | 11/1981 | Greenhead et al. | 198/347.3 |
| 5,845,765 A | * | 12/1998 | Gram | 198/776 |
| 6,065,585 A | * | 5/2000 | Bryant et al. | 198/347.1 |
| 6,422,380 B1 | * | 7/2002 | Sikora | 198/812 |
| 6,725,997 B2 | * | 4/2004 | Draghetti | 198/347.1 |
| 6,793,062 B2 | * | 9/2004 | Hammock et al. | 198/347.1 |

FOREIGN PATENT DOCUMENTS

| | | |
|---|---|---|
| EP | 0 738 478 A2 | 10/1996 |
| EP | 0 738 478 A3 | 7/1997 |
| EP | 0 738 478 B1 | 7/2000 |
| GB | 1 497 340 | 1/1978 |

* cited by examiner

*Primary Examiner*—Richard Ridley
(74) *Attorney, Agent, or Firm*—Marshall, Gerstein & Borun LLP

(57) ABSTRACT

A variable-capacity store (1; 50) for elongated elements (2), in particular tobacco articles, wherein an endless conveyor (8) has a conveying branch (9) for transferring the elongated elements (2) from an input station (3) to an output station (4) of the store (1; 50), and a return branch (10) extending from the output station (4) to the input station (3); each branch (9; 10) is coiled about a relative pair (11; 12) of transmission members, (13, 15; 14, 15); and the two pairs (11; 12) of transmission members (13, 15) (14, 15) share a transmission member (15) movable transversely in controlled manner.

7 Claims, 2 Drawing Sheets

US 6,913,132 B2

VARIABLE-CAPACITY STORE FOR ELONGATED ELEMENTS

TECHNICAL FIELD

The present invention relates to a variable-capacity store for elongated elements.

The present invention may be used to advantage for storing cigarettes, to which the following description refers purely by way of example.

BACKGROUND ART

For storing cigarettes, a variable-capacity store is interposed between a cigarette manufacturing machine and a packing machine to compensate for any difference between the number of cigarettes produced and the number packed.

Patent EP-0738478 describes a variable-capacity store of the "first in-first out" type, which comprises an endless conveyor having a conveying branch for transferring a continuous stream of cigarettes from an input station to an output station of the store, and a return branch extending from the output station to the input station. Each branch is coiled about a pair of rotary transmission members, normally vertical-axis drums, movable transversely with respect to each other; and each pair of transmission members is associated with an actuating device for varying the distance between the axes of the transmission members in the pair, and which is connected to the other actuator device to adjust the lengths of the two branches in complementary manner.

Though efficient, the above known store has proved unsuitable for use on cigarette packing plants, on account of its size and the number of moving parts and relative actuating devices.

U.S. Pat. No. 6,065,585 discloses a reservoir system for rod cigarettes and having a first-in, first out buffer conveyor with a variable capacity; the capacity of the reservoir is varied by moving a pair of guides toward or away from each other. The guides support a conveyor belt for cigarettes in a spiral fashion from a lower input level to a higher output level to compensate for temporary fiddefences in flow rates.

GB-A-1497340 concerns an apparatus for the synchronous running of processing units of production lines with continuous and/or intermittent product flow, particularly for the independently driven processing units of light source manufacturing lines. The latter may consist of at least two independently driven processing units arranged sequentially with respect to product flow in the production line, with an endless transport member, particularly a chain conveyor, driven without slip between the processing units and having a variable capacity of storing.

DISCLOSURE OF INVENTION

It is an object of the present invention to provide a variable-capacity "first in-first out" store, which has the same functional advantages as the known store described above, but which is compact and comprises a minimum number of moving parts and actuating devices.

According to the present invention, there is provided a variable-capacity store for elongated elements as recited by claim 1.

BRIEF DESCRIPTION OF THE DRAWINGS

A number of non-limiting embodiments of the present invention will be described by way of example with reference to the accompanying drawings, in which.

BEST MODE FOR CARRYING OUT THE INVENTION

Figure 1:
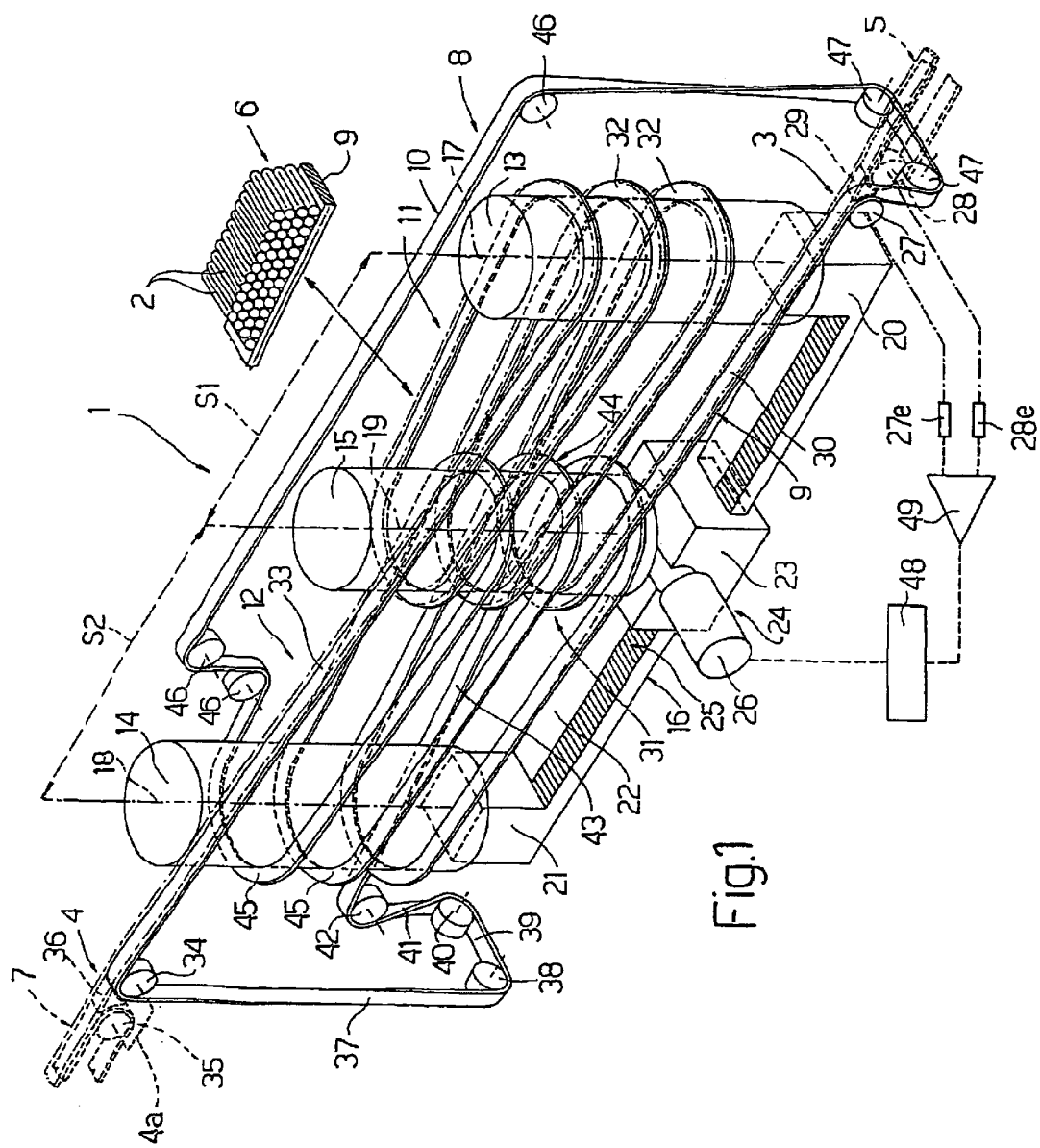
FIG. 1 shows a view in perspective, with parts removed for clarity, of a first preferred embodiment of the store according to the present invention.

Number 1 in FIG. 1 indicates as a whole a variable-capacity store for cigarettes 2, comprising an input station 3 and an output station 4 arranged in series along a path of cigarettes 2. More specifically, store 1 provides for storing a number of cigarettes 2 varying as required within a given range, and for feeding. to station 4 the cigarettes 2 first entering store 1, in use, at station 3.

At input station 3, store 1 receives a continuous stream 6 of cigarettes 2 from an output conveyor 5 of a manufacturing machine (not shown), and feeds stream 6 to an input conveyor 7 of a packing machine (not shown) connected to store 1 at station 4.

Store 1 comprises an endless conveyor 8 having a conveying branch 9 extending, and for conveying cigarettes 2, from station 3 to station 4, and a return branch 10 extending from station 4 to station 3. Branches 9 and 10 are wound about relative pairs 11 and 12 of transmission members, each of which has one of the relative two transmission members in common with the other pair. More specifically, the transmission members comprise three drums 13, 14 and 15, mounted side by side on a support 16 to rotate about respective vertical axes 17, 18 and 19, and of which drum 13 forms part of pair 11, drum 14 forms part of pair 12, and drum 15 is an intermediate drum between the other two and common to both pairs 11 and 12.

Support 16 is defined by a straight beam comprising two fixed end blocks 20 and 21, and a rail 22 connecting blocks 20 and 21 and supporting an axial slide 23. Blocks 20 and 21 support respective drums 13 and 14, which are fixed transversely with respect to rail 22 and have a center distance S; while slide 23 supports drum 15, which has a variable center distance S1 with respect to drum 13, and a variable center distance S2—complementary to S1, where S1+S2=S—with respect to drum 14.

Drum 15 is moved transversely along rail 22 between blocks 20 and 21 by an actuating device 24, which, in addition to slide 23, comprises a rack 25 located along rail 22, and a motor 26 carried by slide 23 and having an output member defined by a pinion (not shown) connected to rack 25 by a rack-pinion coupling (not shown).

Conveyor 8 is defined by a belt conveyor of a total length L, wherein conveying branch 9 is of a length L1 varying with the transverse position of drum 15, and is detoured in a horizontal direction, parallel to rail 22, by an input pulley 27 mounted at input station 3 to rotate about a horizontal axis substantially perpendicular to guide 22 and located parallel and adjacent to the axis of a transmission pulley 28 of conveyor 5, which is connected to conveying branch 9 by a plate 29 between pulleys 27 and 28. Pulleys 27 and 28 have respective encoders 27e and 28e for emitting respective signals proportional to the surface speeds of pulleys 27 and 28.

As of pulley 27, conveying branch 9 extends by a substantially horizontal portion 30 up to drum 15; winds upwards about drums 13 and 15 in pair 11 to form a coil 31 defined by a succession of turns 32 arranged with a given spacing P1 and each wound about drum 13 and drum 15;

and, finally, extends from drum 13 to output station 4 by a substantially horizontal portion 33. Coil 31 is supported in known manner by drums 13 and 15. For example, in a first embodiment of drums 13 and 15, coil 31 is supported by helical grooves (not shown) formed in the outer surfaces of drums 13 and 15. In an alternative embodiment of drums 13 and 15, each drum 13, 15 is defined by a cylindrical supporting member having a central axis coincident with axis 17, 19 of respective drum 13, 15, and by a number of disks (not shown) mounted to rotate idly on the cylindrical member, and each of which acts as a supporting member for coil 31 of conveying branch 9.

The output end of portion 33 is detoured downwards by a powered output pulley 34, which powers conveyor 8 and is mounted at output station 4 to rotate about a horizontal axis substantially perpendicular to rail 22 and parallel and adjacent to the axis of a transmission pulley 35 of conveyor 7. Conveyor 7 is connected to conveying branch 9 by a plate 36 between pulleys 34 and 35, which are connected to each other in known manner by an electric axis 4a so as to rotate, in use, at the same surface speed at all times.

Return branch 10 is of a length L2 variable with the transverse position of drum 15 and complementary to length L1, where L1+L2=1, and comprises an initial portion 37, which extends downwards from the periphery of pulley 34, twists 90° about a vertical axis, and is detoured in a horizontal direction perpendicular to rail 22 by a pulley 38, having an axis parallel to rail 22, to form a horizontal portion 39, which is in turn detoured upwards by a pulley 40, parallel to pulley 38, to form a vertical portion 41. Portion 41 twists 90° about a vertical axis, and is detoured by a pulley 42, having a horizontal axis perpendicular to rail 22, to form a substantially horizontal portion 43 extending up to drum 15 in a substantially parallel direction opposite that of portion 30. Return branch 10 then winds upwards about drums 14 and 15 in pair 12 to form a coil 44 defined by a succession of turns 45 arranged with a given spacing P2, which, in the example shown, is the same as P1. Each turn 45 winds about and is supported in known manner by drums 14 and 15, and is located, about the periphery of drum 15, in an intermediate position between two adjacent turns 32.

For example, in a first embodiment of drums 14 and 15, coil 44 is supported by helical grooves (not shown) formed in the outer surfaces of drums 14 and 15. In an alternative embodiment of drums 14 and 15, each drum 14, 15 is defined by a cylindrical supporting member having a central axis coincident with axis 18, 19 of respective drum 14, 15, and by a number of disks (not shown) mounted to rotate idly on the cylindrical member, and each of which acts as a supporting member for coil 44 of return branch 10.

At the output of coil 44, return branch 10 is detoured towards pulley 27 by a number of pulleys 46 parallel to pulley 42, and by two end pulleys 47 parallel to pulley 40.

Store 1 also comprises a known central control unit 48 connected to motor 26 and for controlling actuating device 24 to adjust distances S1 and S2, and therefore lengths L1 and L2, in complementary manner. Central control unit 48 is also connected to a comparing circuit 49, which receives the output signals from each encoder 27e, 28e, and supplies central control unit 48 with an error signal, proportional to the difference between the surface speeds of pulleys 27 and 28, to adjust the transverse movement of drum 15 along rail 22.

In actual use, cigarettes 2 are fed continuously by conveyor 5 to input station 3, and therefore over plate 29 on to the initial portion 30 of conveying branch 9, and are fed by conveying branch 9 to output station 4, where the first cigarettes 2 to enter store 1 are fed over plate 36 on to conveyor 7.

In normal operating conditions, the number of cigarettes 2 fed by conveyor 5 to station 3 equals the number of cigarettes 2 absorbed by conveyor 7 at station 4, and the initial portion 30 of conveying branch 9 operates at the same linear speed as conveyor 5, so that circuit 49 supplies a zero error signal to central control unit 48, which keeps slide 23 stationary along rail 22.

When the number of cigarettes 2 fed to station 3 is greater than the number of cigarettes 2 absorbed at station 4, i.e. the linear speed of conveyor 5 is greater than that of initial portion 30 of conveying branch 9, comparing circuit 49 supplies an error signal to central control unit 48, which moves drum 15 towards drum 14 to increase length L1 and accordingly reduce length L2, so that the speed at which length L1 increases is added, at input station 3,. to the linear speed of endless conveyor 8 at output station 4 (always equal to the linear speed of conveyor 7), and the-linear speed of initial portion 30 of conveying branch, 9 equals the linear speed of conveyor 5.

The difference between the number of cigarettes 2 fed to input station 3 and the number absorbed at output station 4 can, obviously, only persist until drum 15 reaches a limit position substantially contacting drum 14. Beyond which point, the manufacturing machine (not shown) must be slowed down to create a contrary difference, or even stopped.

Conversely, when the number of cigarettes 2 fed to station 3 is smaller than the number of cigarettes 2 absorbed by conveyor 7 at station 4, central control unit 48 moves drum 15 towards drum 13 to operate store 1 in the opposite way to that described above.

Figure 2:
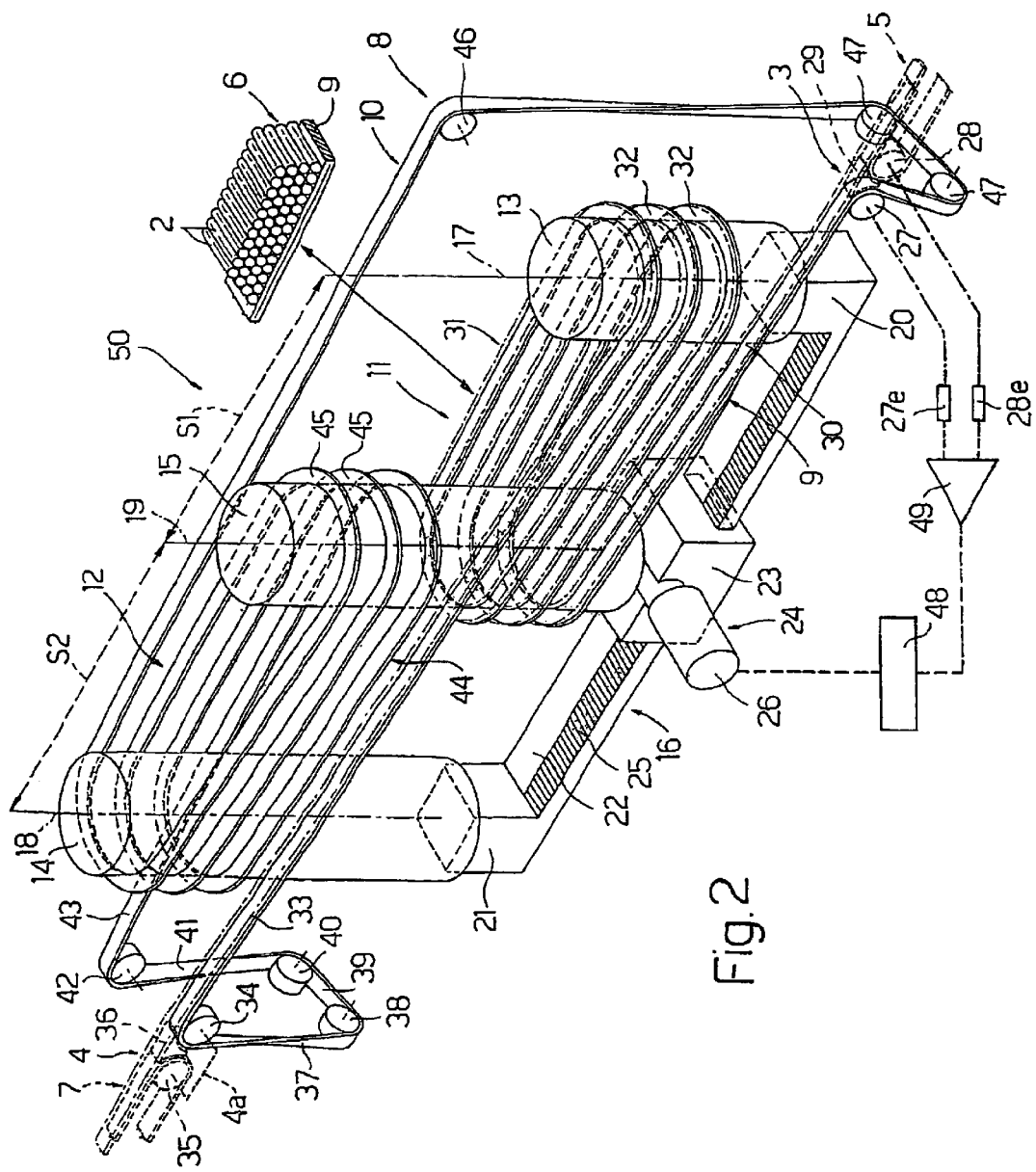
FIG. 2 shows a view in perspective, with parts removed for clarity, of a second preferred embodiment of the store according to the present invention.

The FIG. 2 embodiment shows a store 50 substantially identical with store 1, except that, at drum 15, turns 32 and 45 are arranged in series as opposed to alternating as in store 1. In which case, though spacings P1 and P2 of coils 31 and 44 are the same in the example shown, spacing P2 may be much smaller than P1 to reduce the height of drums 13, 14, 15, seeing as coil 44 carries no cigarettes 2.

What is claimed is:

1. A variable-capacity store for elongated elements of the tobacco industry, the store (1; 50) comprising an input station (3) and an output station (4) arranged in series along a path (P) of the elongated elements (2);

a first fixed transmission member (13);

a second fixed transmission member (14);

a third movable transmission member (15) located between the first fixed transmission member (13) and the second fixed transmission member (14);

actuating means (24) which move the third transmission member (15) between the first fixed transmission member (13) and the second fixed transmission member (14); and an endless conveyor (8) having a conveying branch (9) for transferring the elongated elements (2) from said input station (3) to said output station (4), and a return branch (10) extending from the output station (4) to the input station (3); wherein the conveying branch (9) is wound about the first fixed transmission member (13) and the third movable transmission member (15) for forming a first coil (31) defined by a succession of turns (32) arranged with a given first spacing (P1); and wherein the return branch (10) is wound about the second fixed transmission member (14) and the third movable transmission member (15).

2. The store as claimed in claim 1, wherein said transmission members (13,14,15) are arranged parallel and side by side.

3. The store as claimed in claim 1, wherein the first coil (31) has an adjustable first length (L1); and the return branch (10) is wound about the second fixed transmission member (14) and the third movable transmission member (15) for forming a second coil (44) defined by a succession of turns (45) and having a second length (L2) adjustable in complementary manner with respect to said first length (L1).

4. The store as claimed in claim 3, wherein said second coil (44) is wound about the second fixed transmission member (14) and the third movable transmission member (15) with a given second spacing (P1) equal to the first spacing (P1).

5. The store as claimed in claim 3, wherein, along the third movable transmission member (15), said first and said second coil (31,44) are arranged in series.

6. The store as claimed in claim 3, wherein, along the third movable transmission member (15), said first and said second coil (31, 44) are arranged with respective turns (32,45) alternating.

7. A variable-capacity store for elongated elements, in particular tobacco articles, the store (1; 50) comprising an input station (3) and an output station (4) arranged in series along a path (P) of the elongated elements (2);

a first fixed transmission member (13);

a second fixed transmission member (14);

a third movable transmission member (15) located between the first fixed transmission member (13) and the second fixed transmission member (14);

actuating means (24) which move the third transmission member (15) between the first fixed transmission member (13) and the second fixed transmission member (14); and an endless conveyor (8) having a conveying branch (9) for transferring the elongated elements (2) from said input station (3) to said output station (4), and a return branch (10) extending from the output station (4) to the input station (3); wherein the conveying branch (9) is wound about the first fixed transmission member (13) and the third movable transmission member (15) for forming a first a coil (31) defined by a succession of turns (32) arranged with a given first spacing (P1) and having an adjustable first length (L1); wherein the return branch (10) has a second length (L2) adjustable in complementary manner with respect to said first length (L1).

* * * * *

UNITED STATES PATENT AND TRADEMARK OFFICE
CERTIFICATE OF CORRECTION

PATENT NO. : 6,913,132 B2
DATED : July 5, 2005
INVENTOR(S) : Mario Spatafora

It is certified that error appears in the above-identified patent and that said Letters Patent is hereby corrected as shown below:

Title page,
Item [73], Assignee, "Societa" should be -- Societa' --.

Signed and Sealed this

Eleventh Day of October, 2005

JON W. DUDAS
*Director of the United States Patent and Trademark Office*